United States Patent

Wertman

[15] 3,679,809
[45] July 25, 1972

[54] PIVOT LINKAGE ASSEMBLY KIT

[72] Inventor: Louis Wertman, Jamaica Estates, N.Y.

[73] Assignee: Pic Design Corp., East Rockaway, N.Y.

[22] Filed: Dec. 2, 1970

[21] Appl. No.: 94,393

[52] U.S. Cl. .................................35/13, 35/19 R, 74/469
[51] Int. Cl. ..........................................................G09b 25/02
[58] Field of Search......................35/13, 16, 19 R, 19 A, 27, 35/34, 19 B; 74/469

[56] References Cited

UNITED STATES PATENTS

| | | | |
|---|---|---|---|
| 1,541,179 | 6/1925 | Parkinson | 35/34 |
| 2,885,793 | 5/1959 | Oback | 35/13 |
| 3,193,293 | 7/1965 | Schaper | 35/13 X |
| 3,496,795 | 2/1970 | Dinnendahl | 74/469 |

*Primary Examiner*—Harland S. Skogquist
*Attorney*—James & Franklin

[57] ABSTRACT

A pivot linkage assembly comprises a mounting grid and a plurality of precision ground linkage rods slidingly mounted in parallel pairs within a plurality of pivotal mounting blocks. Means are provided for pivotally mounting said mounting blocks on the slotted mounting structure by means of low-friction pivot sleeves. Several mounting blocks may be pivotally stacked on the same pivot sleeve with spacer means therebetween to insure low-friction relative rotation. Two or more blocks may also be operatively pivotally connected in free floating relationship thereby to form a variety of classic linkage mechanisms and combinations thereof. Precision angularly inscribed dials are provided to enable graphing of linkage motion. The assembly is useful for actual proto-models or for teaching and demonstration purposes.

14 Claims, 11 Drawing Figures

PATENTED JUL 25 1972 3,679,809

INVENTOR
LOUIS WERTMAN
BY
James and Franklin
ATTORNEY

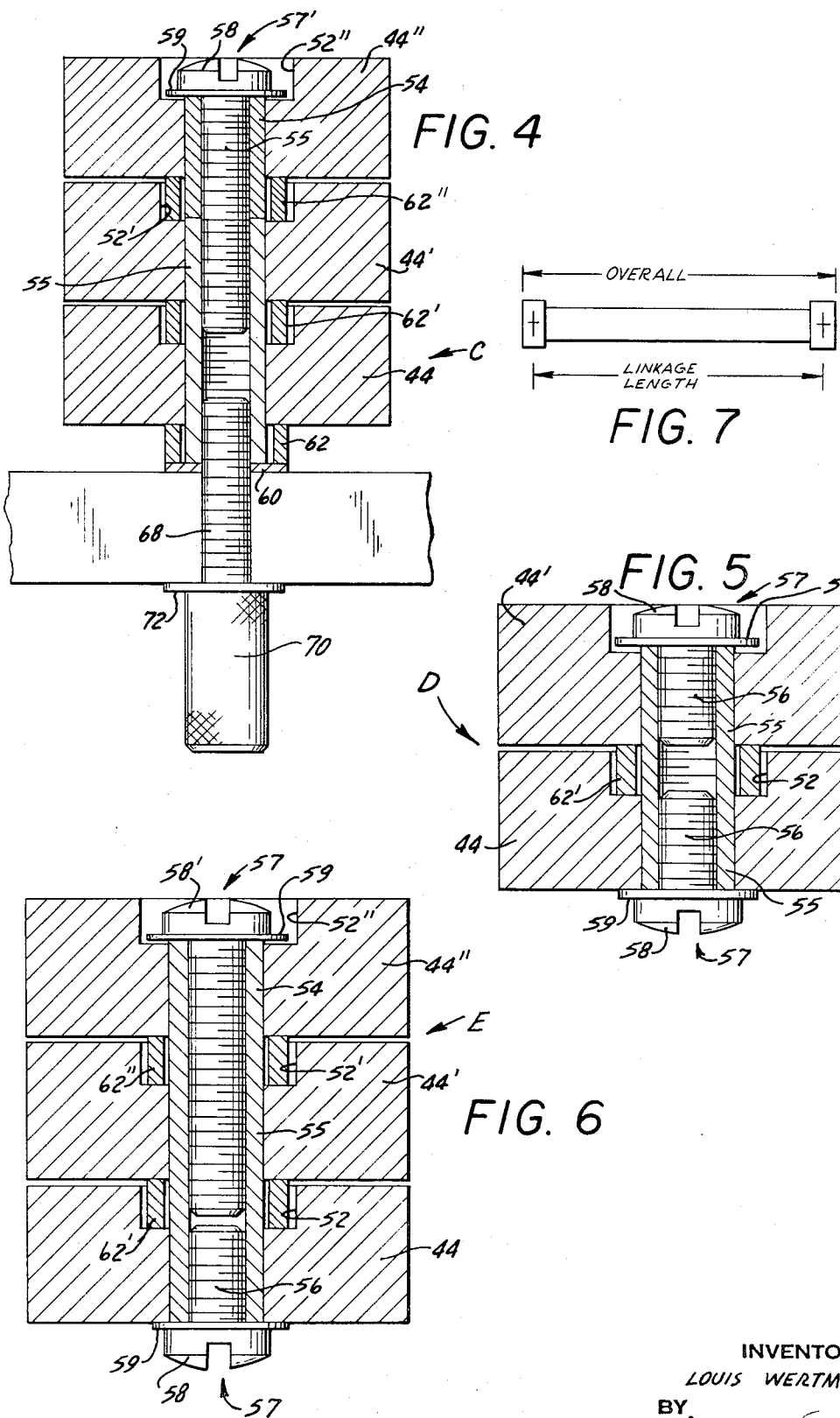

FOUR BAR LINKAGE

QUICK RETURN- OSCILLATING BEAM WITH YOKE

PANTOGRAPH

TOGGLE

INVENTOR
LOUIS WERTMAN
BY *James and Franklin*
ATTORNEY

PIVOT LINKAGE ASSEMBLY KIT

This invention relates to a pivot linkage assembly and more particularly to a pivot linkage assembly kit for constructing a variety of linkage models for design and/or demonstration purposes.

The field of kinematics presents several problems in the area of design and teaching or demonstration. In the area of design it is generally necessary before going into production to construct a proto-model of various linkage mechanisms, simple and complicated, which may be incorporated within a proposed machine or mechanism. Because of the infinite variety of such mechanisms and combinations thereof utilized in present day machine design, it has been customary in the past to construct for each particular mechanism under consideration a rather crude wooden or cardboard model so as to verify at least roughly the theoretically calculated kinematics of the device. These models are either handmade by the designer or custom-made in a machine shop equipped for that purpose. In either case the process is extremely time consuming and expensive, particularly when, as frequently occurs, the model must be redesigned several times before a mechanism with the desired kinematics is produced. Moreover, models produced in this way are generally only rough approximations of the proposed precision mechanism and therefore cannot be relied upon to simulate actual operation in applications where precision is desired.

In the field of teaching of kinematics, there has been a long felt need for a rugged, versatile, demonstration device to enable the students to observe actual linkage mechanisms in operation. In this regard the problems of time and expense discussed above have in the past generally precluded the use of demonstration devices in the teaching of kinematics both at high school and college levels. Where models have been produced by industrious teachers and professors they are generally very crude and limited to particular simple linkage mechanisms. Accordingly, students who are taught kinematics on a purely theoretical basis generally lack the intuitive feel for the subject matter necessary for the design of actual hardware.

It is a primary object of the present invention to design a pivot linkage assembly kit adapted to eliminate the foregoing difficulties.

More particularly, it is an object of the present invention to design a precision pivot linkage assembly which may be used to construct a precision model of any classic linkage mechanism and many combinations thereof.

It is still a further object of the present invention to design a precision pivot linkage assembly kit which is adapted for use by an instructor in demonstration lectures and by students in laboratory experiments to enable such students to observe instantaneously the actual results of theoretical design.

It is yet another object of the present invention to provide a pivot linkage assembly kit which enables the machine designer to instantly construct and continuously adjust proto-models of a variety of simple and complicated linkage mechanisms.

It is still another object of the present invention to design a pivot linkage assembly kit which includes precision angularly inscribed dials to enable the user to accurately plot the position and motion of a link or links of a particular mechanism.

It is another object of the present invention to design a pivot linkage assembly kit which is extremely versatile and thus encourages creative exploration by designers, teachers and students in producing new and varied linkage mechanisms.

It is yet another object of the present invention to design a pivot linkage assembly kit which is lightweight, portable and inexpensive and adapted for use by the designer, teacher or student in office or classroom.

To these ends, the present invention resides in a pivot linkage assembly kit comprising a slotted mounting grid and a series of precision ground rods adapted to be slidingly mounted within a plurality of pivotal mounting blocks. Each link is constructed of two linkage rods mounted in parallel relationship within at least two mounting blocks. Means are provided for pivotally mounting the blocks in stacked relationship on the mounting structure or in free floating relationship. The rods may be either locked in position relative to a mounting block by means of a solder-tipped set screw or allowed to freely slide therein. As a result, an infinite variety of linkage mechanisms may be constructed and continuously adjusted to the desired extent. Precision, angularly inscribed dials may be used wherever it is desired to accurately plot the angular position of a given link.

To the accomplishment of the above, and to such other objects as may hereinafter appear, the present invention relates to a pivot linkage assembly kit as defined in the appended claims and as described in this specification, taken together with the accompanying drawings, in which:

FIG. 4 is a cross-sectional view of three mounting blocks pivotally mounted in stacked relationship on the mounting grid;

FIG. 5 is a cross-sectional view of two mounting blocks pivotally mounted in free floating relationship;

FIG. 6 is a cross-sectional view of these mounting blocks pivotally mounted in free floating relationship;

FIG. 7 is a schematic illustration of a link showing how its actual length may be measured.

Figure 1:
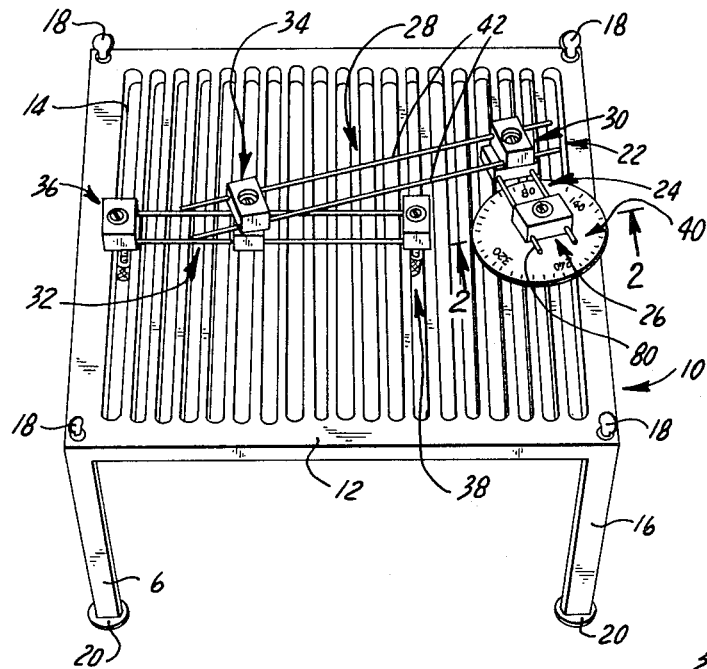
FIG. 1 is a perspective view of the pivot link assembly of the present invention showing an assembled slider crank mechanism.

Referring to the drawings and particularly to FIG. 1, the pivot linkage assembly kit of the present invention comprises a mounting grid generally designated 10 comprising a metal plate 12 having a plurality of longitudinally extending slots 14. The plate 12 may be supported at its four corners by legs 16 which are secured thereto by suitable means such as thumb screws 18. A cushion disc 20 is provided at the bottom of each leg to provide stability and prevent vibration.

Purely by way of example a slider crank mechanism generally designated 22 is shown in FIG. 1 in its fully assembled form mounted on mounting grid 10. In general terms this mechanism comprises a first link generally designated 24 pivotally mounted at one end on the mounting grid by means of a pivot assembly generally designated 26, a second link generally designated 28 pivotally connected to the other end of link 24 by means of a pivot assembly generally designated 30, and pivotally and slidably connected at its other end to a third link generally designated 32 by means of a mounting assembly generally designated 34. Link 32 is fixedly mounted at both ends on the mounting grid 10 by means of mounting assemblies generally designated 36 and 38 respectively. An angularly inscribed precision dial generally designated 40 is fixedly mounted on mounting grid 10 below mounting assembly 26 and is adapted to provide an accurate indication of the angular position of link 24. It will be noted that each link comprises two precision ground linkage rods 42 mounted in parallel relation to improve accuracy.

It will be apparent that a variety of simple and complicated linkage mechanisms may be constructed in a similar manner. It has been found that five basic mounting assemblies are necessary to design all of the classic linkage mechanisms. These five basic mounting structures are illustrated in FIGS. 2–6 respectively and for convenience will be designated by the letters A, B, C, D, and E respectively.

Figure 2:
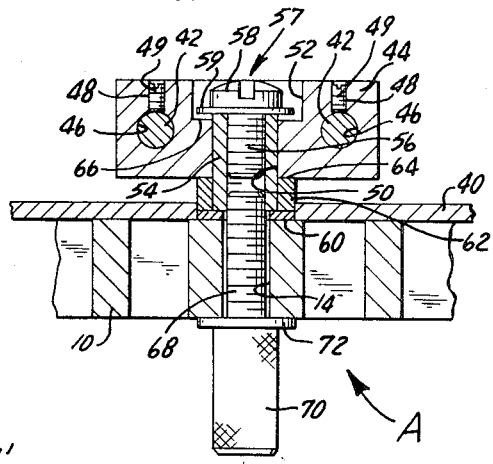
FIG. 2 is a cross-sectional view taken along the line 2—2 of FIG. 1 and showing a single mounting block pivotally mounted on the mounting grid.

Referring now to FIG. 2, mounting assembly A is designed to provide a fixed (as opposed to floating) pivotal mounting of a single link on mounting grid 10. For this purpose there is provided a mounting block 44 having two transverse precision bored cylindrical apertures 46 in parallel relationship adapted to receive respectively the two precision ground rods 42 which form the link. Communicating with apertures 46 are small vertical threaded apertures 48 adapted to receive set screws 49 to lock rods 42 against sliding movement within apertures 46. (For convenience and clarity apertures 48 and set screws are not shown in FIGS. 3–6, it being understood that all the mounting blocks herein described are provided with this feature). Because rods 42 are precision ground to great accuracy, the set screws used for this purpose are preferably of a type having a soft metal or solder tip thereon which will not mar the finish of rods 42. A set screw which is particularly useful for this application is described in co-pending application Ser. No. 877,695 by Lew Wesker entitled "Solder Tip Set Screw" filed on Nov. 18, 1969 and assigned to the assignee of the present invention. Mounting blocks 44 is provided with a central vertical aperture 50 counterbored at 52 and adapted to receive a hollow cylindrical pivot sleeve 54 therein. Pivot sleeve 54 is internally threaded and receives the threaded shaft 56 of a screw 57, the slotted head 58 of the screw operatively engaging pivot sleeve 54 at one end thereof with a washer 59 therebetween. The other end of pivot sleeve 54 resets on a washer 60 which, in turn, rests on grid 10 with its aperture centered on one of its longitudinal slots 14.

Mounting block 44 is spaced from washer 60 and grid 10 by means of an annular spacer member 62 which is received on lower end of pivot sleeve 54 in surrounding relationship thereto. Both spacer 62 and sleeve 54 are made of a low-friction material such as Teflon and together form a low-friction pivot seat, the upper surface 64 of spacer 62 providing low-friction vertical support for block 44 spaced from mounting grid 10. In this configuration it will be seen that washer 59 is slightly spaced from the shoulder 66 of counterbore 52 and serves to prevent mounting block 44 from becoming detached from its pivotal mounting. If desired angularly inscribed dial 40 may be mounted on grid 10 surrounding and snugly engaging spacer 62 and washer 60 as illustrated in FIG. 2.

The entire mounting assembly A is secured on mounting grid 10 by means of a threaded shaft 68 extending through slot 14 of the grid and threadedly engaging the lower end of pivot sleeve 54. Shaft 68 is provided at its lower end with a knurled knob 70 and a flange 72 which engages the underside of the grid when the knurled knob is tightened.

The foregoing configuration may be used whenever it is desired to secure a single link directly to the mounting structure. For example, in FIG. 1 link 32 is secured at either end by assemblies 36 and 38 directly to the mounting grid 10. In this configuration the link is fixedly secured with relation to the grid 10 and no pivotal motion is possible, the link merely serving to slidably mount a third mounting assembly such as that designated 34. In this case set screws 49 would be inserted into threaded apertures 48 to lock linkage rods 42 in the desired position. Alternatively, one end of a link may be pivotally mounted on the grid 10 by means of mounting assembly A with its other end in free floating pivotal engagement with a second link. This arrangement is exemplified by link 24 in FIG. 1. If it is desired to fix the pivot point on link 24 as would be the case in the slider crank mechanism of FIG. 1, the locking set screws again would be used. In addition, the angular orientation of link 24 may be monitored by means of angularly inscribed disc 40.

Figure 3:
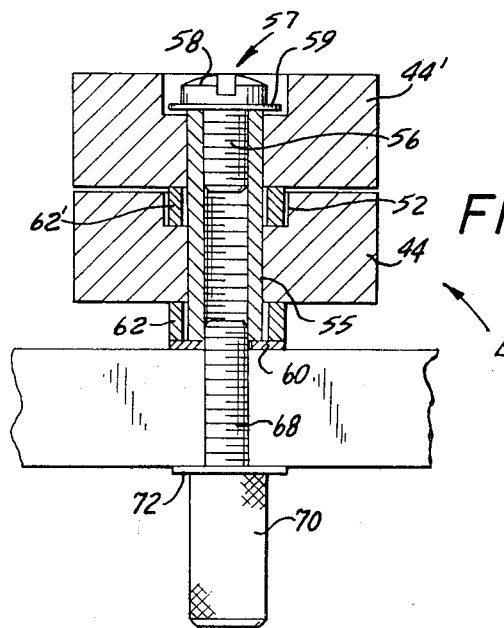
FIG. 3 is a cross-sectional view of two mounting blocks pivotally mounted in stacked relationship on the mounting grid.
Figure 8:
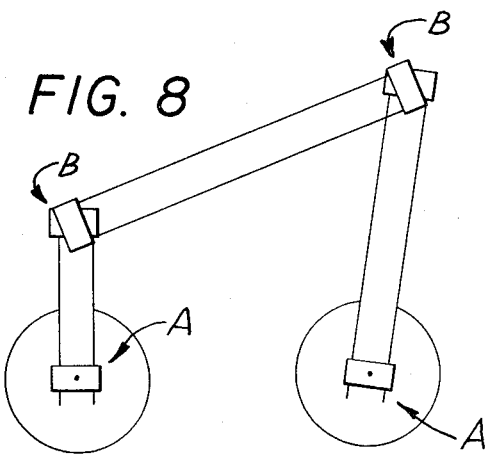
FIGS. 8–10 are schematic illustrations of named linkage mechanisms adapted to be assembled using the components of this invention.

Turning now to FIG. 3, the B configuration shown there is similar to the A configuration with the addition of a second mounting block 44' mounted above block 44 on the same pivot sleeve 55. Pivot sleeve 55 is accordingly longer than sleeve 54 in FIG. 2 to accommodate two stacked mounting blocks 44 and 44'. The two mounting blocks are spaced from each other by means of an annular spacer 62' identical to spacer 62, the bottom end of which is received within bore 52 of block 44. Thus block 44' like block 44 is vertically supported on a low-friction spacer means, in spaced relation from block 44.

Figure 9:
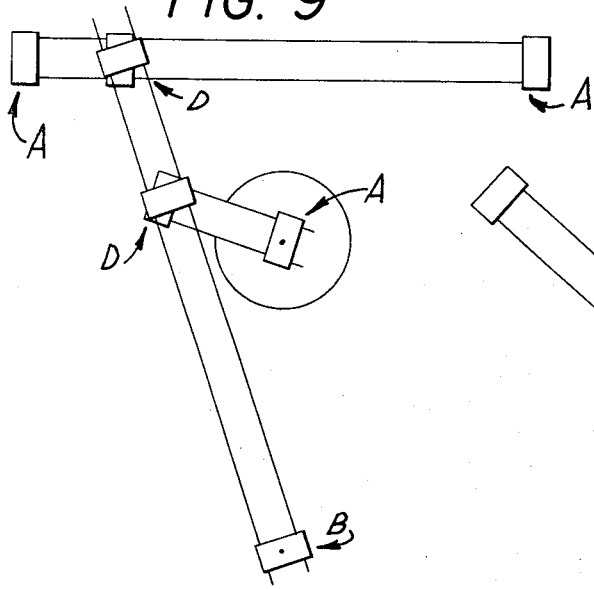
Figure 10:
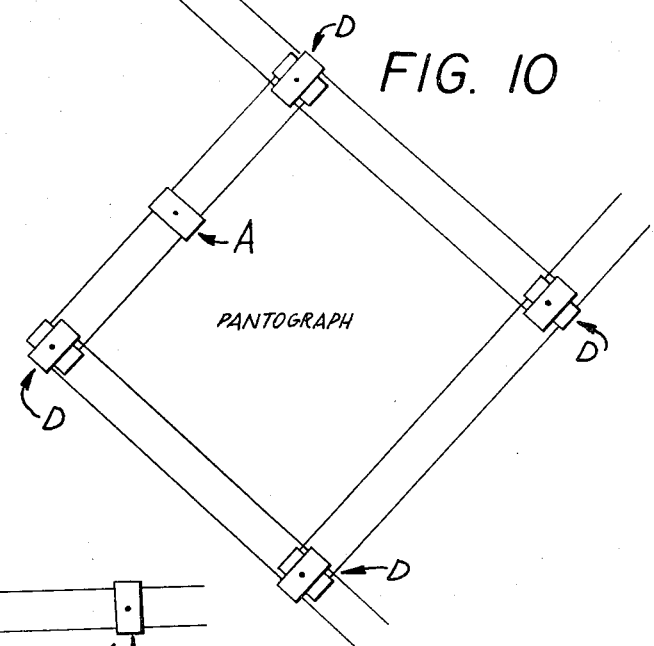
Figure 11:
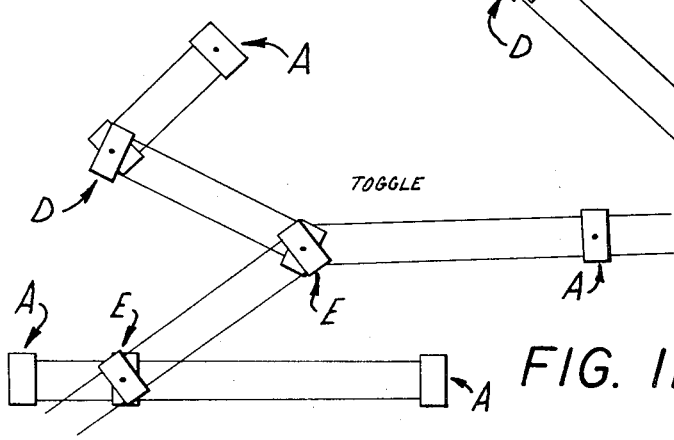

It will be appreciated that assembly B provides a single fixed pivot mounting for two overlapping links in stacked relationship. This assembly will also be used for pivotally mounting a single link when the link must pass over the lower block 44 (i.e., when the link is on the second level of blocks). In such a case the link would be mounted in the apertures (not shown) in the upper block 44' the lower block merely serving to properly space the upper block for receiving a second level link. An example of this structure is found in the anchor pivot of a "Quick Return-Oscillating Beam with Yoke," (FIG. 9).

Assembly C shown in FIG. 4 is merely an extension of assembly B and provides a fixed pivot mounting for three overlapping links. For this purpose an additional sleeve 54 identical to that shown in FIG. 4 is placed in contiguous end-to-end abutting relationship with sleeve 55 and a second annular spacer 62 is inserted in counterbore 52' of mounting block 44'. A third mounting block 44 is pivotally seated on spacer 62'' and sleeve 54. Screw 57' is threadedly engaged in sleeve 54 and its shaft 56' is long enough to extend into and be threadedly secured to sleeve 55, its slotted head 58' operatively engaging sleeve 54 with a washer 59 therebetween. As in the previous assemblies washer 59 is spaced from counterbore 52'' and serves to retain block 44'' on its pivotal mounting without, however, providing any continuous frictional engagement. When mounting block 44'' is thus secured on the assembly it will be appreciated that the solid threaded shaft 55 provides structural rigidity for the two-piece pivot sleeve comprising abutting sleeves 55 and 54.

FIGS. 5 and 6 show the double (D) and triple (E) floating pivot assemblies and correspond generally to fixed pivot assemblies B and C (FIGS. 3 and 4), respectively. However, the floating pivot assemblies are secured at their lower ends by means of screws 57 and washers 59. Thus, in assembly D, mounting block 44' is pivotally seated on spacer 62' and sleeve 55 in spaced relation from block 44. In assembly E mounting blocks 44' and 44'' are pivotally mounted in spaced, stacked relation on sleeve 55 and spacer 62' and sleeve 54 and spacer 62'', respectively. In both of these assemblies the lower block 44 need not pivot with respect to the lower screw 57 and washer 59 and thus no intermediate low friction spacer is provided. In practice, the pivot assembly may be adapted to float along one or more links. Thus in assembly D both blocks may be slidable along their respective links or, alternatively, one block may be locked to its associated link by means of set screws 48, the assembly then being slidable along the other link. Likewise in assembly E the pivot may float along two or all three of the associated links. In both assemblies the lower screw head 58 must be small enough to clear the mounting grid 10 as the assembly floats thereabove. In this regard the lower spacers 62 adjacent the grid 10 in assemblies A, B, and C serve to elevate the linkage rods 42 sufficiently to enable the associated floating pivot assemblies to clear the grid.

It will be appreciated from the foregoing that a wide variety of linkage mechanisms may be easily and rapidly assembled on the mounting grid 10 utilizing the five pivot assemblies disclosed. Thus, for example, the slider crank mechanism illustrated in FIG. 1 utilizes three fixed pivot assemblies A (those designated 26, 36, and 38) and two floating pivot assemblies D (those designated 30 and 34).

To construct this assembly the following steps must be carried out. The three A assemblies are mounted in the center of the grid 10 as shown. The crank pivot assembly 26 should be located at the extreme right on the grid and if desired may include the angularly inscribed dial 40 in accordance with the construction of FIG. 2. The D pivot 34 is assembled in accordance with FIG. 5. The rods of link 32 are inserted successively through one of the fixed pivot assemblies 36 or 38, the lower mounting block 44 of the floating pivot 34 and the other fixed pivot. To facilitate this operation and ensure proper alignment the thumbscrews on assemblies 36 and 38 should be loosened prior to insertion of the linkage rods. When the rods are in proper position the thumbscrews are tightened and set screws 49 on both A assemblies 36 and 38 are tightened to secure the rods of link 32 fixedly on the mounting grid 10. The rods of link 24 are then inserted into A assembly 26 (the crank pivot) and locked therein by means of set screws 49. The rods of link 24 should extend out from block 44 a small distance as at 80 to provide for the attachment of a suitable pointer element (not shown) for use with the dial 40. The second D pivot 30 is then assembled and the other end of the rods of link 24 are inserted in the lower mounting block 44 thereof. In order to lock these rods in block 44, the upper block 44' must be rotated to a position generally transverse to block 44, as shown, thereby to expose the set screw apertures 48 on the upper surface of block 44. (It will be noted that for this purpose the blocks are rectangular, the smaller dimension being less than the distance between rod mounting apertures 46). The set screws 49 are then tightened in which condition they are retained below the upper surface of lower block 44 (see FIG. 2) to prevent interference with upper block 44'. Finally the rods of link 28 are inserted within the upper mounting blocks 44' of D assemblies 34 and 30 and locked therein by means of set screws 49. The position of link 32 may now be adjusted (upwardly or downwardly as shown in FIG. 1) to ensure proper operation (i.e., 360° rotation of the crank 24 without interference between floating pivot 34 and fixed pivots 36 and 38).

For purposes of demonstration or design it may be desired to accurately measure the linkage lengths. For this purpose blocks 44 are manufactured to precise dimensions, the pivot aperture being accurately centered therein. Thus, to accurately measure the linkage length it is only necessary to measure, using suitable means such as a caliper or scale, the overall distance between the outside oppositely facing surfaces of the corresponding mounting blocks and subtract twice the distance between the pivot center and this surface, or in other words, the width (smaller dimensions) of block 44 (typically one-half inch) (see FIG. 7).

The assemblies constructed in accordance with the foregoing are particularly useful as demonstration or laboratory models. Thus, taking the slider crank mechanism of FIG. 1 as an example, the following demonstrations may be made:

Dynamic Characteristics

The dynamic characteristics of the mechanisms may be conveniently demonstrated by rotating the crank linkage 24 about pivot assembly 26 and defining the function of each linkage.

Mathematical Relationships

A variety of mathematical relationships may be readily demonstrated. For example, the crank linkage 24 may be rotated until be rotated until the sliding pivot assembly 34 is in the extreme left-hand position. It may be shown that this position is determined by the sum of the lengths of crank 24 and coupler 28. The crank 24 may then be rotated until the sliding pivot assembly 34 is in the extreme right-hand position demonstrating that this position is determined by the difference in lengths of the crank 24 and coupler 28 linkages. The fact that the stroke of the sliding pivot assembly 34 is a function of the length of crank linkage 24 may be empirically demonstrated.

Slider Motion

To demonstrate slider motion the crank linkage 24 is set in a vertical position (aligned with slots 14). The dial 40 is rotatably adjusted until a zero reading is obtained by reference to the pointer (not shown). The dial may then be secured in this position by any suitable means (i.e., scotch tape). The position of the sliding pivot assembly 34 is then marked by suitable means (i.e., on a pad secured to the mounting grid 12). The crank is then rotated a small amount and both the angular and linear displacements of crank linkage 24 and sliding pivot assembly 34 respectively may be noted. This procedure may be repeated and a curve of the slider displacement versus angular crank displacement may be conveniently plotted.

Direct Plotting

If desired, the motion of any point on any link may be plotted directly on a suitably positioned piece of graph paper. Alternatively a direct plot of slider motion versus angular crank motion may be made by providing a scale (in degrees) on the graph paper and successively moving the paper (relative to static link 32) and the crank in the same angular increments (i.e., 10°) each time plotting the position of the sliding pivot 34. The points are then joined to demonstrate the motion obtained.

A host of other points, too numerous to mention, can be discussed and empirically demonstrated.

It will be appreciated that a variety of other linkage mechanisms of varying complexity may be readily assembled for demonstration, experimentation or actual design using the foregoing components.

A few examples of some of the more common linkage mechanisms which may be constructed in accordance with the present invention are illustrated schematically in FIGS. 8–11 with the appropriate pivot assemblies designated by letter.

It will be appreciated from the foregoing that I have provided a lightweight, compact kit having an assortment of precision components from which accurate models of all of the classic linkage mechanisms can be readily assembled. Demonstration of these mechanisms has proved extremely useful at both high school and college levels in such courses as physics, kinematics, machine design, and mechanical drawing to name only a few. Moreover, the components are strong and sturdy enough for continued experimental use by students or engineers in the laboratory. The use of solder tipped set screws protects the precision finish of the linkage rods.

All of the assembly components may be manufactured to standard dimensions and tolerances for ready replacement or addition. All linkage rods are preferably made of buckle proof stainless steel, straight to an accuracy of 0.0003 inch per inch. The mounting blocks are also preferably made of stainless steel and are precision ground. As a result problems may be solved to an accuracy within 0.010 inch.

For the designer the present invention eliminates the need for kinematic phase plots, drawings and the delays inherent in custom-made models. Moreover, mechanisms may be instantly debugged thereby eliminating the need for redesigning, over and over again.

While only a limited number of preferred embodiments of the present invention have been specifically described herein, it will be apparent that many variations may be made therein all within the scope of the present invention as defined in the following claims.

I claim:

1. A linkage assembly kit for assembling pivotal linkage mechanisms comprising a mounting board having a plurality of apertures therein, a plurality of elongated links, a plurality of mounting blocks each adapted to slidably mount a link and having means to lock a slidably mounted link against sliding movement relative to said block, means adapted to be received in said apertures in said mounting board to pivotally mount said mounting blocks on said mounting board above said mounting board apertures, and means to mount said blocks in stacked relationship for relative rotation, whereby a variety of pivotal linkage mechanisms may be mounted on said mounting board.

2. The linkage assembly kit of claim 1, wherein said apertures in said mounting board are substantially parallel slots, said means for mounting said mounting blocks on said mounting board being adapted to extend through said slots.

3. The linkage assembly kit of claim 1, wherein each of said elongated links comprises a plurality of elongated rods and wherein each of said mounting blocks is provided with a plurality of substantially parallel apertures adapted respectively to slidably receive said plurality of rods in substantially parallel relationship.

4. The linkage assembly kit of claim 3, wherein said means for locking a link against sliding movement relative to a mounting block comprises a plurality of apertures in each of said mounting blocks communicating, respectively, with said plurality of rod receiving apertures therein and a plurality of set screws adapted to be received respectively in said communicating apertures and to operatively respectively engage said plurality of rods.

5. The linkage assembly kit of claim 3, wherein each of said mounting blocks is further provided with a pivot aperture extending therethrough generally transversely to said rod receiving apertures and further comprising a low-friction pivot means adapted to be received within said pivot aperture.

6. The linkage assembly kit of claim 4, wherein each of said mounting blocks is further provided with a pivot aperture extending therethrough generally transversely to said rod receiving apertures and further comprising a low-friction pivot means adapted to be received within said pivot aperture.

7. The linkage assembly kit of claim 1, wherein each of said mounting blocks is further provided with a pivot aperture extending therethrough generally transversely to said rod receiving apertures and further comprising a low-friction pivot means adapted to be received within said pivot aperture.

8. The linkage assembly kit of claim 7, wherein said low friction pivot means comprises a pivot pin and further comprising a shaft extending through one of said apertures in said mounting board and operatively connected to one end of said pivot pin, and effective to secure said one end of said pivot pin to said mounting board, the other end of said pivot pin being pivotally received in said pivot aperture of said mounting block and spacer means between said mounting board and said mounting block, whereby said mounting block rests on said spacer means and pivots on said pivot pin.

9. The pivot assembly of claim 8, further comprising means for limiting the axial movement of said mounting block relative to said pivot pin.

10. The pivot assembly of claim 8, wherein said pivot pin is hollow and internally threaded and wherein one end of said shaft is externally threaded, said one end of said shaft being threadedly secured in the hollow of said pivot pin.

11. The pivot assembly of claim 10, wherein the other end of said shaft extends through one of said apertures in said mounting board and is provided with means engaging the underside of said mounting board.

12. The pivot assembly of claim 11, wherein the other end of said shaft is provided with a knurled knob, whereby said pivot end may be loosened or detached from said mounting board by turning said knob.

13. The pivot assembly of claim 9, wherein said pivot pin is hollow and internally threaded and wherein one end of said shaft is externally threaded, said one end of said shaft being threadedly secured in the hollow of said pivot pin.

14. The pivot assembly of claim 13, wherein said means for limiting axial movement of said mounting block on said pivot pin comprises a headed screw threadedly engaged in the hollow of the other end of said pivot pin.

* * * * *